E. W. FAIRBANKS.
AUTOMOBILE WHEEL.
APPLICATION FILED APR. 15, 1919.

1,346,084.

Patented July 6, 1920.
2 SHEETS—SHEET 1.

Witness:
W. M. Gentle

Inventor
Ephraim W. Fairbanks.
by James R. Townsend
his Atty.

E. W. FAIRBANKS.
AUTOMOBILE WHEEL.
APPLICATION FILED APR. 15, 1919.
1,346,084.
Patented July 6, 1920.
2 SHEETS—SHEET 2.
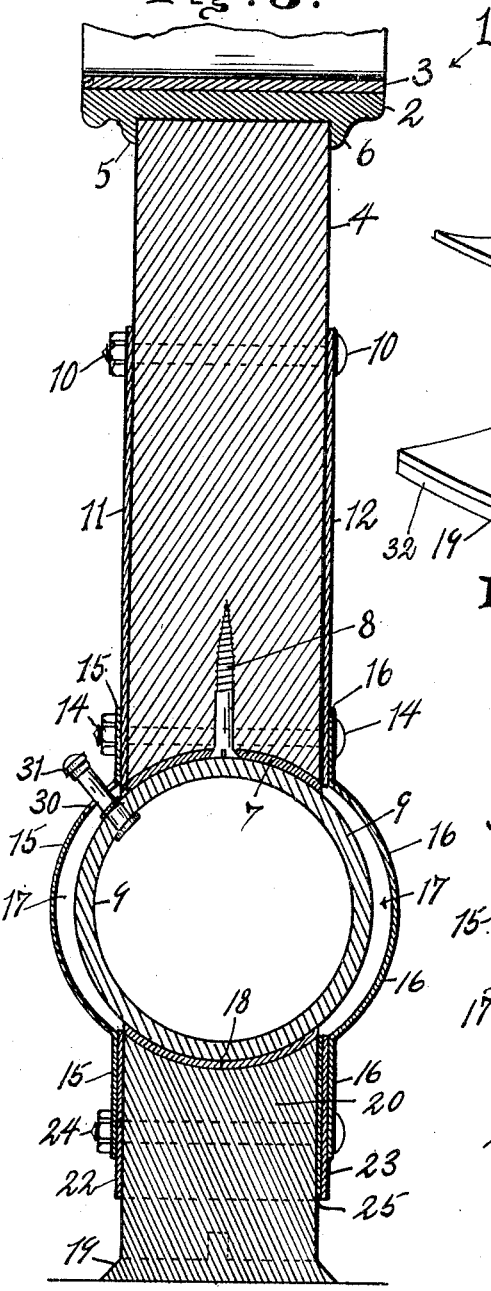
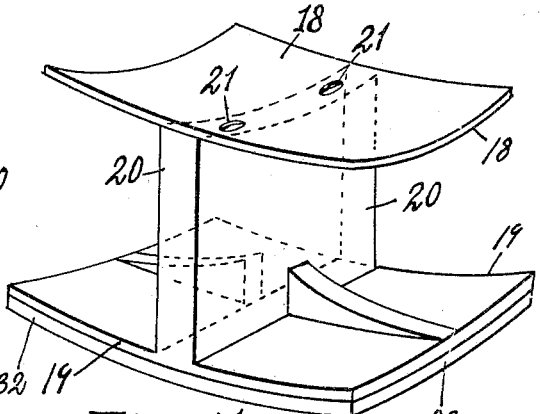
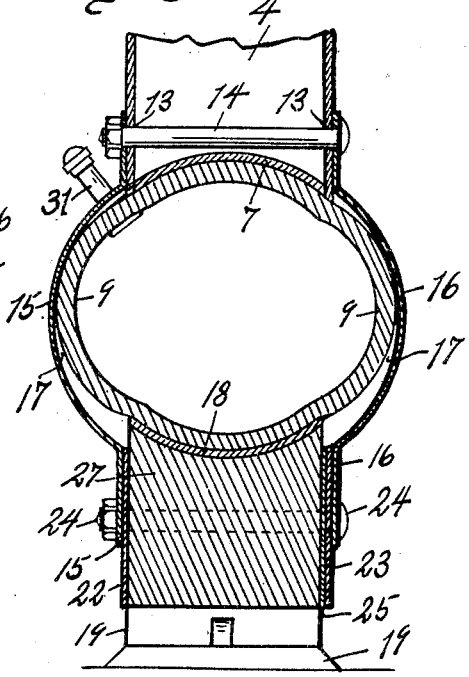
Witness:
W. M. Gentle.
Inventor
Ephraim W. Fairbanks.
by
James R. Townsend
his Atty.

UNITED STATES PATENT OFFICE.

EPHRAIM W. FAIRBANKS, OF SAN DIEGO, CALIFORNIA.

AUTOMOBILE-WHEEL.

1,346,084.  Specification of Letters Patent.  Patented July 6, 1920.

Application filed April 15, 1919. Serial No. 290,307.

*To all whom it may concern:*

Be it known that I, EPHRAIM W. FAIRBANKS, a citizen of the United States, residing at San Diego, in the county of San Diego and State of California, have invented a new and useful Improved Automobile-Wheel, of which the following is a specification.

This invention relates to improvements in automobile wheels and it may be said to consist of the new and novel features and in the improved construction, combination and arrangement of parts, the purpose of which will be apparent to those skilled in the art, from a consideration of the preferred form of construction herein shown.

The principal object of this invention is to provide a novel construction whereby a wheel with a metallic tread will be as resilient in carrying a load and absorbing shocks as the ordinary rubber tire automobile wheel.

Another object of this invention is to provide a wheel of the character indicated above and of substantial construction; that can be easily made and assembled; that can be manufactured and sold at a reasonable cost and that will be exceedingly durable.

Another object of this invention is to provide a metallic tread wheel with a pneumatic tube, which tube will be located a considerable distance above the ground and fully inclosed by metallic casings.

Another feature of the invention is shown in the means for securing the metallic tread to the rim of the wheel; and the means provided for its resilient movement.

Other objects, advantages and features of invention will appear from the accompanying drawings, the subjoined detail description and the appended claim.

The drawings illustrate the invention.

Fig. 3 is a section on the staggered line $x^3$—$x^3$ of Fig. 1.

Fig. 4 is a perspective view of one unit of the metallic tread; and a segment of plate that contacts with the periphery of the pneumatic tube.

Fig. 5 is a section on the line $x^5$—$x^5$ of Fig. 1, showing the position of the pneumatic tube when there is a pressure on the wheel.

Figure 1:
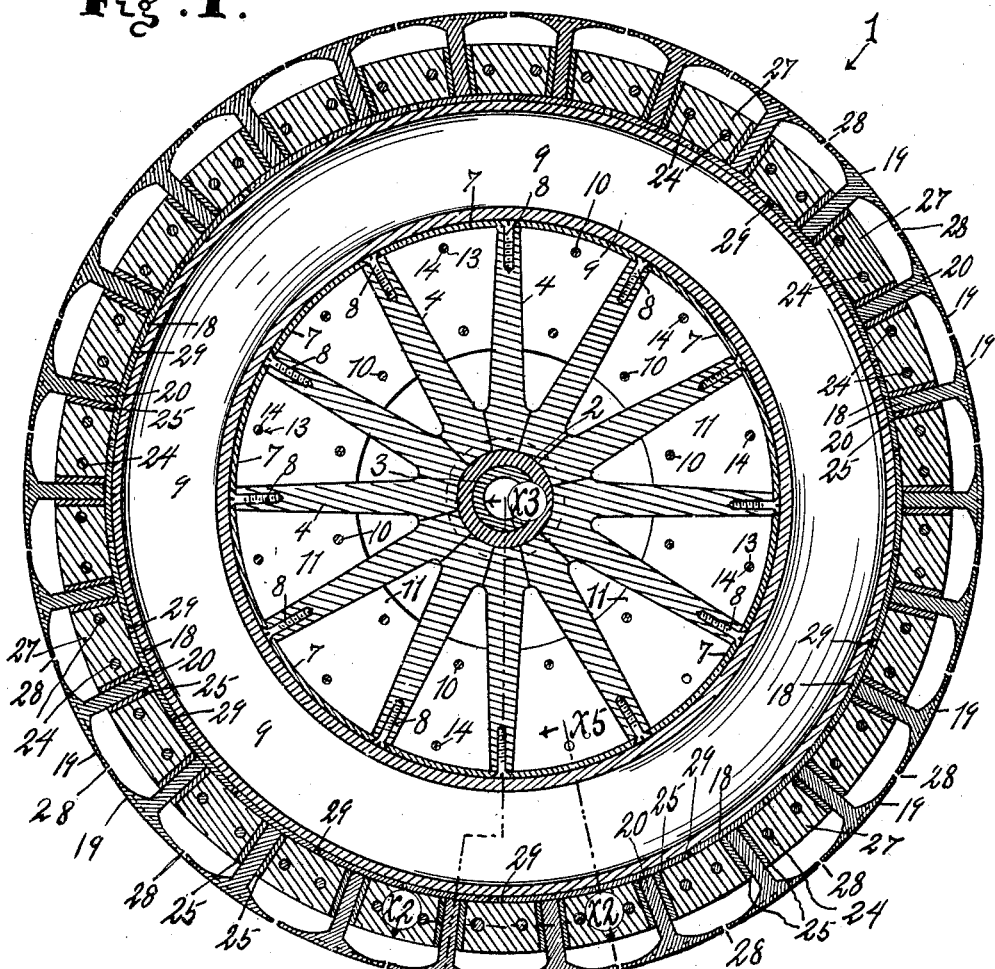
Figure 1 is a central section through the wheel on a plane at right angles to a longitudinal plane through the wheel hub.

In detail the wheel 1 has the hub 2 which is provided with the bushing 3; and this hub can be of any form adapted to automobile or vehicle use.

Around the hub 2 there is secured a plurality of spokes 4 that are retained on the hub by means of their close fit and the flanges 5 and 6 that extend outward from the hub and contact with the butts of the spokes.

The spokes 4 are of equal length and have their outer ends secured to the rim 7 by the screws 8; which screws have their heads countersunk in the exterior surface of the rim 7 and are screwed into the ends of the spokes as shown in Fig. 1.

In cross section the rim 7 is the segment of a circle and forms a channel or bed for the annular cushion which is shown as a pneumatic tube 9.

On each side of the wheel 1 there is secured to the spokes 4 by means of the bolts 10 the annular plates 11 and 12. These bolts 10 are about midway between the hub 2 and the rim 7; and they pass between the spokes 4 and by means of the tension of the nuts on said bolts the plates are clamped to the spokes of the wheel.

Near to the outer edge of the plates 11 and 12 there are holes 13 that are an equal radial distance from the center of the wheel hub; and through these holes 13 are extended the bolts 14 by which means outer annular flanges 15 and 16, extending beyond the tube 9, are secured to the wheel.

The center portion of the outer annular flanges 15 and 16 are bulged outward around the pneumatic tube 9 to form the clearance 17 between said tube and the inner surfaces of the foregoing flanges in order to give the tube room to flatten as shown in Fig. 5, when the wheel 1 is pressed downward by weight or shock.

Contacting with the outer surface of the tube 9 are the segments 18 of the metallic tread 19; and the segment 18 is secured to the inward extension 20 of the tread 19 by means of the screws 21.

The segmental tread members respectively comprise the segment 18, tread 19 and their connections. Each of said tread members forms one unit in the tread of the wheel and the means of transmitting the movement of the tread to the pneumatic tube, for as seen in Fig. 1 these units are positioned to completely encircle the annular cushion or pneumatic tube.

On each side of these units there is secured to the extensions of the flanges 15 and 16 other annular flanges 22 and 23 which flanges are secured together by the bolts 24.

Figure 2:
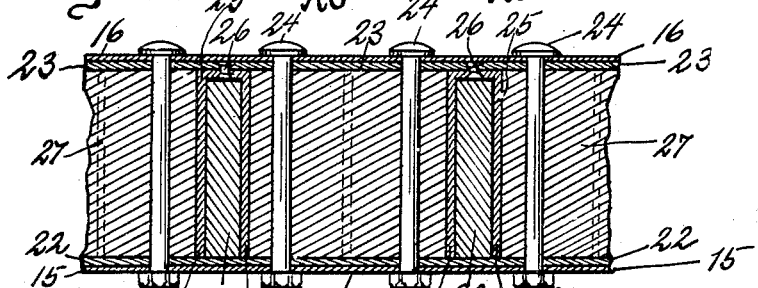
Fig. 2 is a section on the arc $x^2$—$x^2$ of Fig. 1.

There is also secured to the flange 23 the U shaped bearings 25 that envelop the extensions 20 of the treads 19 best shown in Figs. 1 and 2. Preferably these bearings 25 are secured to the annular flange 23 by the rivets 26; however, they may be secured by welding or by any other well known means; their purpose being to form a metallic bearing for the extensions 20 as these parts have a reciprocating motion in said bearings.

Also there are fitted into the spaces between the bearings 25 the wood blocks 27 which are secured in place by the bolts 24 that pass therethrough; and the purpose of these wood blocks is to reinforce the outer walls of the bearings 25 and to space apart the annular flanges 22 and 23.

Also it will be seen from the drawings that the wood blocks help to hold the segments 18 from outward movement; and by means of the inner surface form a seat for the segments 18.

There is a slight clearance 28 between each of the metallic treads 19; and also a clearance 29 between the segments 18 whereby these units are free to move inwardly toward the center of the wheel without interference.

From the foregoing it can easily be seen that when the wheel is weighted and rotated as in travel the units formed of the parts 18, 19, 20 and 21 will be consecutively moved inwardly as they contact with the ground and impart their movement to the annular resilient cushion or pneumatic tube by which means the shock will be absorbed by the wheel.

As seen in Fig. 3, there is a slot 30 through the flange 15 and through this slot there is extended the air valve 31 by which valve the pneumatic tube 9 is inflated. The air valve 31 is of common construction and its principle well known, consequently a detailed description is not given.

Also as seen in Figs. 3 and 5 the flanges 15 and 16 are so secured to the wheel that they can be removed to replace the pneumatic tube or to replace or repair other parts.

As seen in Fig. 4 there can be placed on the outside of the metallic tread 19 a hard rubber tread 32 which rubber tread will assist the tube 9 in absorbing shock and eliminating the noise of travel. I prefer, however, not to be limited to hard rubber as other resilient material may be used.

This invention admits of modifications and changes and a right is reserved to all such modifications and changes as do not depart from the scope of this invention.

I claim:

In a wheel, an annular resilient cushion on the rim of the wheel; outer annular flanges secured to the wheel and extending beyond said cushion; bearings secured between said flange extensions; segmental tread members arranged outside of the periphery of the annular flanges and provided with inward extensions slidably mounted in said bearings, said inward extensions having segmental plates secured thereto and adapted to bear on the resilient cushion for reciprocating said tread members; and blocks secured between said bearings and said flange extensions, said blocks being adapted to reinforce the walls of the bearings and to space the flange extensions a definite distance apart and also to restrict the outward movement of the tread members by the contact of the blocks with said plates.

In testimony whereof I have hereunto set my hand at Los Angeles, California, this fourth day of April, 1919.

EPHRAIM W. FAIRBANKS.

Witness:
    WM. M. GENTLE.